United States Patent
Zhan et al.

(10) Patent No.: US 10,614,542 B2
(45) Date of Patent: Apr. 7, 2020

(54) HIGH GRANULARITY LEVEL GPU RESOURCE ALLOCATION METHOD AND SYSTEM

(71) Applicant: HUAWEI TECHNOLOGIES CO., LTD., Guangdong (CN)

(72) Inventors: Xusheng Zhan, Beijing (CN); Cong Wang, Beijing (CN); YunGang Bao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 171 days.

(21) Appl. No.: 15/844,333

(22) Filed: Dec. 15, 2017

(65) Prior Publication Data

US 2018/0108109 A1    Apr. 19, 2018

Related U.S. Application Data

(63) Continuation of application No. PCT/CN2016/083314, filed on May 25, 2016.

(30) Foreign Application Priority Data

Jun. 19, 2015    (CN) .......................... 2015 1 0345468

(51) Int. Cl.
*G06F 9/46* (2006.01)
*G06T 1/20* (2006.01)
(Continued)

(52) U.S. Cl.
CPC ............. *G06T 1/20* (2013.01); *G06F 9/505* (2013.01); *G06F 9/5038* (2013.01);
(Continued)

(58) Field of Classification Search
None
See application file for complete search history.

(56) References Cited

U.S. PATENT DOCUMENTS

| 8,643,656 B2 | 2/2014 | Li et al. |
| 2012/0081373 A1 | 4/2012 | Li et al. |

(Continued)

FOREIGN PATENT DOCUMENTS

| CN | 102508820 A | 6/2012 |
| CN | 103336718 A | 10/2013 |
| CN | 103729167 A | 4/2014 |

OTHER PUBLICATIONS

Jayvant Anantpur et al, PRO: Progress Aware GPU Warp Scheduling Algorithm. 2015 IEEE International Parallel and Distributed Processing Symposium, Jul. 20, 2015, 10 pages.

(Continued)

*Primary Examiner* — Wissam Rashid
(74) *Attorney, Agent, or Firm* — Kilpatrick Townsend & Stockton LLP

(57) ABSTRACT

The present invention provides a GPU resource allocation method. A to-be-distributed kernel program in a kernel status register table is identified by using a global logic controller (201). The global logic controller searches in an SM status register table for an SM that can run at least one complete block, and the SM status register table is configured to store a quantity of available resources in each SM (202). When the global logic controller does not find the SM that can run at least one complete block, the SM status register table is searched for a first SM, and the first SM is an SM that can run at least one warp (203). When the global logic controller finds the first SM, a block in the to-be-distributed kernel program is distributed to the first SM (204).

14 Claims, 6 Drawing Sheets

(51) Int. Cl.
*G06F 9/50* (2006.01)
*G09G 5/00* (2006.01)

(52) U.S. Cl.
CPC .......... *G06F 9/5083* (2013.01); *G09G 5/001* (2013.01); *G09G 2352/00* (2013.01); *G09G 2360/06* (2013.01); *G09G 2360/08* (2013.01)

(56) References Cited

U.S. PATENT DOCUMENTS

| | | |
|---|---|---|
| 2014/0109102 A1 | 4/2014 | Duncan et al. |
| 2014/0173611 A1 | 6/2014 | Meixner |
| 2014/0204098 A1 | 7/2014 | Dietrich et al. |
| 2016/0140686 A1* | 5/2016 | Lueh ................. G06F 9/462 345/522 |

OTHER PUBLICATIONS

Martin Burtscher et al. A Quantitative Study of Irregular Programs on GPUs. IEEE 2012. total 10 pages.

Ivan Tanasic et al. Enabling Preemptive Multiprogramming on GPUs. IEEE 2014. total 12 pages.

Yu Yong et al. Thread Mapping Model from CUDA to Heterogeneous Many-core Architecture, Computer Engineering, vol. 38 No. 9. May 2012. pp. 282-287.

Ping Xiang et al. Warp-Level Divergence in GPUs: Characterization, Impact, and Mitigation, IEEE 2014. total 12 pages.

Nvidia, "Programming guide—CUDA toolkit documentation," 2017. total 301 pages.

* cited by examiner

HIGH GRANULARITY LEVEL GPU RESOURCE ALLOCATION METHOD AND SYSTEM

CROSS-REFERENCE TO RELATED APPLICATIONS

This application is a continuation of International Application No. PCT/CN2016/083314, filed on May 25, 2016, which claims priority to Chinese Patent Application No. 201510345468.9, filed on Jun. 19, 2015. The disclosures of the aforementioned applications are hereby incorporated by reference in their entireties.

TECHNICAL FIELD

The present invention relates to the field of computer technologies, and in particular, to a GPU resource allocation method and system.

BACKGROUND

As a general-purpose GPU (Graphic Processing Unit, graphics processing unit) technology develops, a GPU can process not only image load, but also a general program of a specific type. Currently, when multiple different kernel programs need to access the GPU, the kernel programs that request to access the GPU usually access the GPU one by one by means of serialization according to a chronological order in which requests are sent. If a long-delayed kernel program is occupying the GPU, when a kernel program of a higher priority needs to access the GPU, the kernel program of a higher priority cannot access the GPU until the previous kernel program accessing the GPU and a kernel program waiting for accessing the GPU complete running and an SM (Stream Multiprocessor, streaming multiprocessor) resource in the GPU is released. Consequently, the kernel program of a higher priority cannot obtain a timely response, and quality of service is affected.

For preventing the long-delayed kernel program from exclusively occupying the SM resource in the GPU for a long time, when a kernel program of a high priority needs to access the GPU, an idle SM may be searched for, and when the idle SM is found, the kernel program of a high priority is distributed to the idle SM for running.

However, if the GPU has no idle SM, the kernel program of a high priority cannot be run until an idle SM appears in the GPU. Consequently, the kernel program of a high priority cannot obtain a timely response.

SUMMARY

Embodiments of the present invention provide a GPU resource allocation method and system, so as to resolve a problem that a kernel program of a high priority cannot obtain a timely response.

To achieve the foregoing objective, the embodiments of the present invention use the following technical solutions:

According to a first aspect, an embodiment of the present invention provides a graphics processing unit GPU resource allocation method, where the method is applied to a GPU resource allocation system, the system includes a global logic controller and at least two streaming multiprocessors SMs that can communicate with the global logic controller, and the method includes:

determining, by the global logic controller, a to-be-distributed kernel program in a kernel status register table, where the kernel status register table includes a priority of each still-running kernel program and a quantity of undistributed blocks in each still-running kernel program, and the to-be-distributed kernel program is a kernel program that has a highest priority in the kernel status register table and in which a quantity of undistributed blocks is not zero;

searching, by the global logic controller, an SM status register table for an SM that can run at least one complete block, where the SM status register table is configured to store a quantity of available resources in each SM; and when the global logic controller does not find the SM that can run at least one complete block, searching the SM status register table for a first SM, where the first SM is an SM that can run at least one warp; or when the global logic controller finds the first SM, distributing a block in the to-be-distributed kernel program to the first SM.

With reference to the first aspect, in a first possible embodiment, after the searching, by the global logic controller, an SM status register table for an SM that can run at least one complete block, the method further includes:

when the global logic controller finds the SM that can run at least one complete block, determining a first quantity, where the first quantity is a quantity of blocks that can be actually run by the SM that can run one complete block; and when a quantity of undistributed blocks in the to-be-distributed kernel program is greater than the first quantity, distributing a first quantity of blocks in the to-be-distributed kernel program to the SM that can run at least one complete block; or when a quantity of undistributed blocks in the to-be-distributed kernel program is less than or equal to the first quantity, distributing all undistributed blocks in the to-be-distributed kernel program to the SM that can run at least one complete block.

With reference to the first possible embodiment of the first aspect, in a second possible embodiment, after the global logic controller distributes one block in the to-be-distributed kernel program to the first SM, the method further includes:

determining, by a first SM logic controller, a block of a highest priority in a block status register table, where the first SM logic controller is an SM logic controller in the first SM, and the block status register table includes a priority of each block distributed to the first SM;

searching, by the first SM logic controller, for a current idle hardware warp; and when the first SM logic controller determines that the idle hardware warp can run one warp and a block of a higher priority is not received, distributing one warp in the block of the highest priority to the idle hardware warp, and updating the block status register table.

With reference to any one of the first aspect or the foregoing possible embodiments of the first aspect, in a third possible embodiment, the SM status register table includes a quantity of remaining registers, a quantity of remaining hardware warps, and remaining shared storage space of each SM, and the first SM is an SM in which a quantity of remaining registers is greater than a quantity of registers required for running one warp, in which a quantity of remaining hardware warps is greater than a quantity of hardware warps required for running one warp, and whose remaining shared storage space is greater than shared storage space required for running one warp.

With reference to the third possible embodiment of the first aspect, in a fourth possible embodiment, when the first SM logic controller determines that the idle hardware warp can run one warp and a block of a higher priority is not received, after the distributing one warp in the block of the highest priority to the hardware warp, the method further includes:

when the first SM logic controller determines that there is a warp whose running is complete, instructing the global logic controller to update a quantity of remaining registers, a quantity of remaining hardware warps, and remaining shared storage space of the first SM in the SM status register table.

According to a second aspect, an embodiment of the present invention provides a graphics processing unit GPU resource allocation system, where the system includes a global logic controller and at least two streaming multiprocessors SMs that can communicate with the global logic controller, and the global logic controller includes: a first determining unit, a first searching unit, and a first distribution unit;

the first determining unit is configured to determine a to-be-distributed kernel program, where a kernel status register table includes a priority of each still-running kernel program and a quantity of undistributed blocks in each still-running kernel program, and the to-be-distributed kernel program is a kernel program that has a highest priority in the kernel status register table and in which a quantity of undistributed blocks is not zero;

the first searching unit is configured to search an SM status register table for an SM that can run at least one complete block, where the SM status register table is configured to store a quantity of available resources in each SM; and when the SM that can run at least one complete block is not found, search the SM status register table for a first SM, where the first SM is an SM that can run at least one warp;

the first distribution unit is configured to: when the first SM is found, distribute a block in the to-be-distributed kernel program to the first SM; and the first SM is configured to run the block in the to-be-distributed kernel program distributed by the first unit.

With reference to the second aspect, in a first possible embodiment, the first determining unit is further configured to: when the first searching unit finds the SM that can run at least one complete block, determine a first quantity, where the first quantity is a quantity of blocks that can be actually run by the SM that can run one complete block;

the first distribution unit is further configured to: when a quantity of undistributed blocks in the to-be-distributed kernel program is greater than the first quantity, distribute a first quantity of blocks in the to-be-distributed kernel program to the SM that can run at least one complete block; or when a quantity of undistributed blocks in the to-be-distributed kernel program is less than or equal to the first quantity, distribute all undistributed blocks in the to-be-distributed kernel program to the SM that can run at least one complete block; and the SM that can run at least one complete block is configured to run the blocks in the to-be-distributed kernel program distributed by the first distribution unit.

With reference to the first possible embodiment of the second aspect, in a second possible embodiment, the first SM includes:

a second determining unit, configured to determine a block of a highest priority in a block status register table, where a first SM logic controller is an SM logic controller in the first SM, and the block status register table includes a priority of each block distributed to the first SM;

a second searching unit, configured to search for a current idle hardware warp; and a second distribution unit, configured to: when it is determined that the idle hardware warp can run one warp and a block of a higher priority is not received, distribute one warp in the block of the highest priority to the idle hardware warp, and update the block status register table.

With reference to any one of the second aspect or the foregoing possible embodiments of the second aspect, in a third possible embodiment, the SM status register table includes a quantity of remaining registers, a quantity of remaining hardware warps, and remaining shared storage space of each SM, and the first SM is an SM in which a quantity of remaining registers is greater than a quantity of registers required for running one warp, in which a quantity of remaining hardware warps is greater than a quantity of hardware warps required for running one warp, and whose remaining shared storage space is greater than shared storage space required for running one warp.

With reference to the third possible embodiment, in a fourth possible embodiment, the first SM further includes a notification unit; and the notification unit is configured to: when it is determined that there is a warp whose running is complete, instruct the global logic controller to update a quantity of remaining registers, a quantity of remaining hardware warps, and remaining shared storage space of the first SM in the SM status register table.

According to the GPU resource allocation method and system provided in the embodiments of the present invention, the global logic controller determines the to-be-distributed kernel program in the kernel status register table; searches the SM status register table for the SM that can run at least one complete block; when the SM that can run at least one block is not found, continues to search for the first SM that can run at least one warp; and distributes the block in the to-be-distributed kernel program to the first SM. Compared with the prior art in which only when there is an idle SM in a GPU, a block in a kernel of a high priority can be distributed to the SM, and consequently, the kernel program of a high priority cannot obtain a timely response, in the embodiments of the present invention, when the SM that can run at least one block is not found, the first SM that can run at least one warp is searched for, instead of waiting for another kernel program to release a resource. The warp is smaller than the block, and therefore, completing running one warp is faster than completing running one block, so that the SM that can run at least one warp is easier to find. After the SM that can run at least one warp is found, one block in the to-be-distributed kernel program may be distributed to the first SM, and there is no need to wait for the kernel program of a low priority to complete running one block, so that a response speed of the kernel program of a high priority is improved.

BRIEF DESCRIPTION OF DRAWINGS

The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
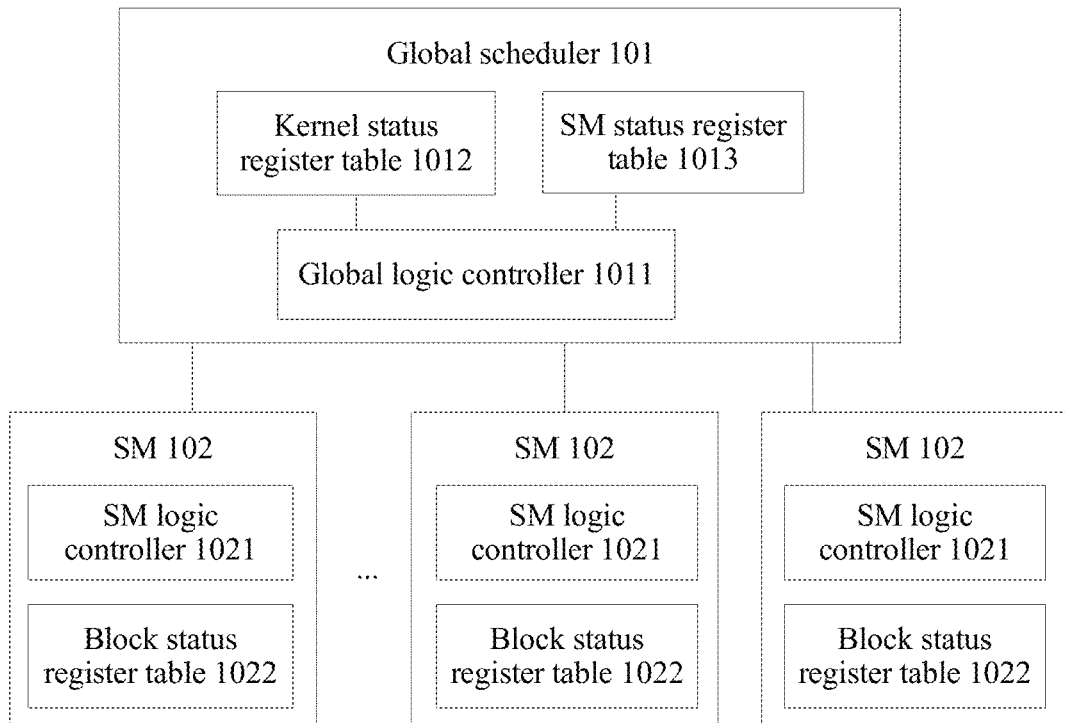
FIG. 1 is a schematic diagram of a logical structure of a GPU resource allocation system according to an embodiment of the present invention.

An embodiment of the present invention is applied to a GPU resource allocation system. As shown in FIG. 1, the system includes a global scheduler 101 and at least two SMs 102 that can communicate with the global scheduler 101.

The global scheduler 101 includes: a global logic controller 1011, a kernel status register table 1012, and an SM status register table 1013.

The SM 102 includes: an SM logic controller 1021 and a block status register table 1022.

The global scheduler 101 is configured to distribute a kernel program to the SM 102 for running.

The global logic controller 1011 is configured to distribute the kernel program to the SM 102 according to the kernel status register table 1012 and the SM status register table 1013 by using a block or a warp as a granularity.

It should be noted that in this embodiment of the present invention, the kernel (kernel) program is a program that can run on a GPU. The kernel program includes at least two blocks (block). The one block includes at least two warps (warp), which is a set of threads that include 32 GPU threads.

The kernel status register table 1012 is configured to store information about each still-running kernel program.

Information about a kernel program includes information indicating a priority of the kernel program, a quantity of registers required for running the kernel program, shared storage space required for running the kernel program, and a quantity of undistributed blocks in the kernel program.

The SM status register table 1013 is configured to store a current quantity of available resources in each SM 102.

The current quantity of available resources in each SM 102 includes a quantity of remaining registers, a quantity of remaining hardware warps, and remaining shared storage space.

The SM 102 is configured to run the kernel program distributed by the global scheduler 101.

The SM logic controller 1021 is configured to distribute, according to the block status register table, a warp in a block to a hardware warp for running.

The block status register table 1022 is configured to store a running status of each block.

The running status of the block includes a priority of the block, a number of a kernel to which the block belongs, a number of the block in the kernel, a quantity of registers and shared storage space that are required by a part that is in the block and that does not run, and a quantity of undistributed warps in the block.

Figure 2:
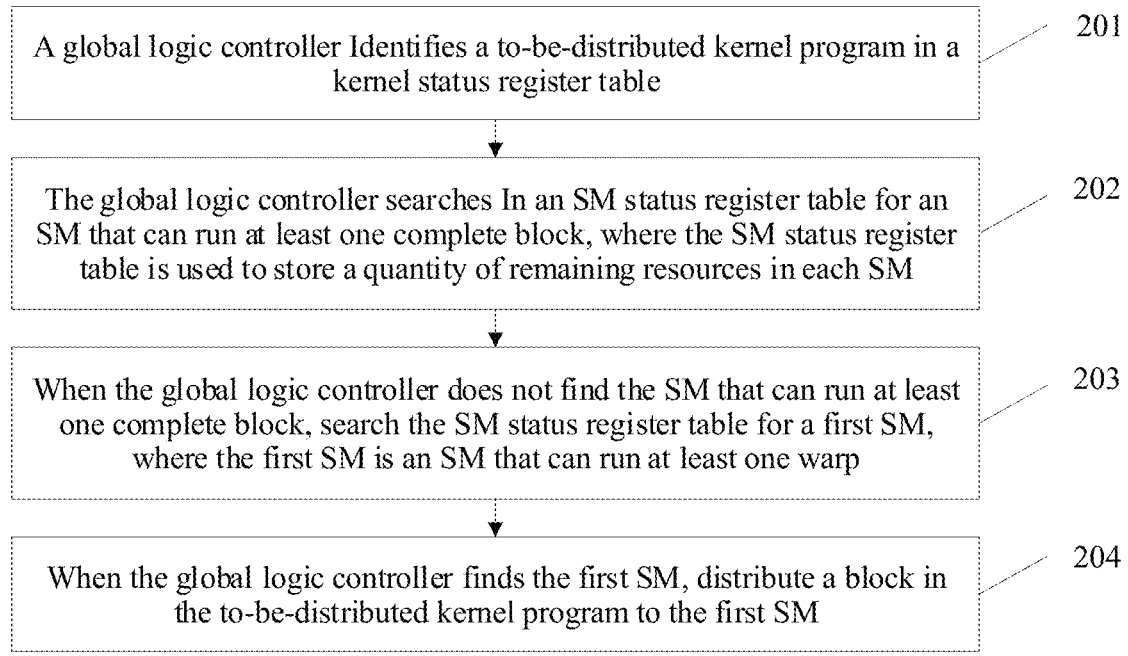
FIG. 2 is a flowchart of a GPU resource allocation method according to an embodiment of the present invention.

To accelerate a response speed of a kernel program of a high priority, an embodiment of the present invention provides a GPU resource allocation method, and the method is applied to the GPU resource allocation system shown in FIG. 1. As shown in FIG. 2, the method includes the following steps.

201. A global logic controller identifies a to-be-distributed kernel program in a kernel status register table.

The kernel status register table includes values indicating a priority of each still-running kernel program and a quantity of undistributed blocks in each still-running kernel program, and the to-be-distributed kernel program is a kernel program that has a highest priority in the kernel status register table and in which a quantity of undistributed blocks is not zero.

202. The global logic controller searches in an SM status register table for an SM that can run at least one complete block, where the SM status register table is configured to store a quantity of available resources in each SM.

The SM status register table specifically includes values indicating a quantity of remaining registers, a quantity of remaining hardware warps, and remaining shared storage space of each SM. The SM that can run at least one complete block is an SM in which a quantity of remaining registers is greater than a quantity of registers required for running one block, in which a quantity of remaining hardware warps is greater than a quantity of hardware warps required for running one block, and whose remaining shared storage space is greater than shared storage space required for running one block.

For example, running one block needs a register of 36 KB, but only a register of 20 KB is left in an SM. Therefore, the SM cannot run one block.

203. When the global logic controller does not find the SM that can run at least one complete block, search in the SM status register table for a first SM, where the first SM is an SM that can run at least one warp.

It may be understood that the first SM is an SM in which a quantity of remaining registers is greater than a quantity of registers required for running one warp, in which a quantity of remaining hardware warps is greater than a quantity of hardware warps required for running one warp, and whose remaining shared storage space is greater than shared storage space required for running one warp.

It should be noted that when running one block needs a register of 36 KB but only a register of 12 KB is left in an SM having a largest quantity of remaining resources, the global logic controller cannot find the SM that can run at least one block; and running one warp only needs a register of 6 KB, and in this case, the SM having the register of 12 KB left can run two warps, that is, the global logic controller can find the first SM.

204. When the global logic controller finds the first SM, distribute a block in the to-be-distributed kernel program to the first SM.

If remaining resources in the first SM can run only one warp, after the block in the to-be-distributed kernel program is distributed to the first SM, the first SM runs warps in the block one by one.

It should be noted that when the global logic controller does not find the first SM, the method is repeated starting from step 201, and the global logic controller can find the first SM after waiting for one warp in a running kernel of a low priority to complete running.

According to the GPU resource allocation method provided in this embodiment of the present invention, the global logic controller identifies the to-be-distributed kernel program in the kernel status register table; searches in the SM status register table for the SM that can run at least one complete block; when the SM that can run at least one block is not found, continues to search for the first SM that can run at least one warp; and distributes the block in the to-be-distributed kernel program to the first SM. Compared with the prior art in which only when there is an idle SM in a GPU, a block in a kernel of a high priority can be distributed to the SM, and consequently, the kernel program of a high priority cannot obtain a timely response, in this embodiment of the present invention, when the SM that can run at least one block is not found, the first SM that can run at least one warp is searched for, instead of waiting for another kernel program to release a resource. The warp is smaller than the block, and therefore, completing running one warp is faster than completing running one block, so that the SM that can run at least one warp is easier to find. After the SM that can run at least one warp is found, one block in the to-be-distributed kernel program may be distributed to the first SM, and there is no need to wait for the kernel program of a low priority to complete running one block, so that the response speed of the kernel program of a high priority is improved.

Figure 3:
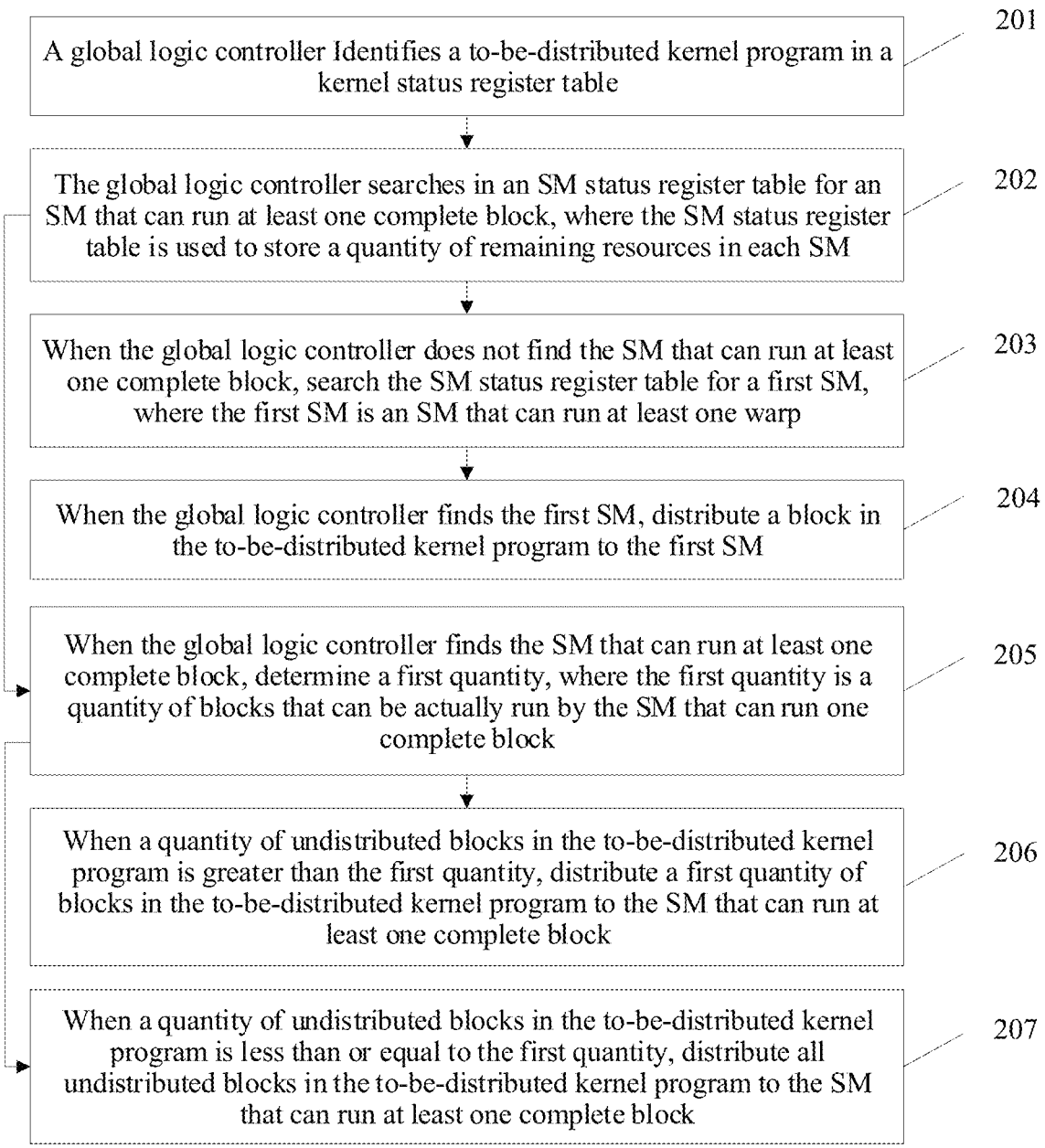
FIG. 3 is a flowchart of another GPU resource allocation method according to an embodiment of the present invention.

As a supplement to the foregoing embodiment, in another implementation of the embodiment of the present invention, as shown in FIG. 3, after the foregoing step 202 in which the global logic controller searches in an SM status register table for an SM that can run at least one complete block, if the SM that can run at least one complete block is found, the following steps 205 to 207 are performed.

205. When the global logic controller finds the SM that can run at least one complete block, determine a first quantity of blocks that can be actually run by the SM that can run one complete block.

The first quantity is determined by the global logic controller by using the SM status register table in the SM that can run at least one complete block. According to a quantity of remaining resources in the SM stored in the SM status register table and a quantity of resources required for running one block, the global logic controller can calculate the quantity of blocks that can be actually run by the SM.

206. When a quantity of undistributed blocks in the to-be-distributed kernel program is greater than the first quantity, distribute a first quantity of blocks in the to-be-distributed kernel program to the SM that can run at least one complete block.

It should be noted that when a quantity of blocks included in the to-be-distributed kernel program is greater than the first quantity, it indicates that a remaining resource in the found SM is not sufficient for running all blocks in the to-be-distributed kernel program. Therefore, the first quantity of blocks are first distributed to the SM, and when there is a block that completes running and releases a resource in the SM, a remaining block in the to-be-distributed kernel is distributed to the SM.

207. When a quantity of undistributed blocks in the to-be-distributed kernel program is less than or equal to the first quantity, distribute all undistributed blocks in the to-be-distributed kernel program to the SM that can run at least one complete block.

It should be noted that in the foregoing steps 204, 206, and 207, after the global logic controller distributes the block to the SM, the quantity of undistributed blocks in the to-be-distributed kernel program in the kernel status register needs to be updated.

According to the GPU resource allocation method provided in this embodiment of the present invention, when the global logic controller finds the SM that can run at least one block, the first quantity is determined; when the quantity of undistributed blocks in the to-be-distributed kernel program is greater than the first quantity, the first quantity of blocks in the to-be-distributed kernel program are distributed to the SM that can run at least one complete block; or when the quantity of blocks included the to-be-distributed kernel program is less than or equal to the first quantity, all undistributed blocks in the to-be-distributed kernel program are distributed to the SM that can run at least one complete block. When the SM that can run at least one block is found, as many blocks as possible in the kernel of the highest priority are distributed to the SM, so that the kernel of the highest priority can obtain a timely response, and the response speed of the kernel program of a high priority is improved.

Figure 4:
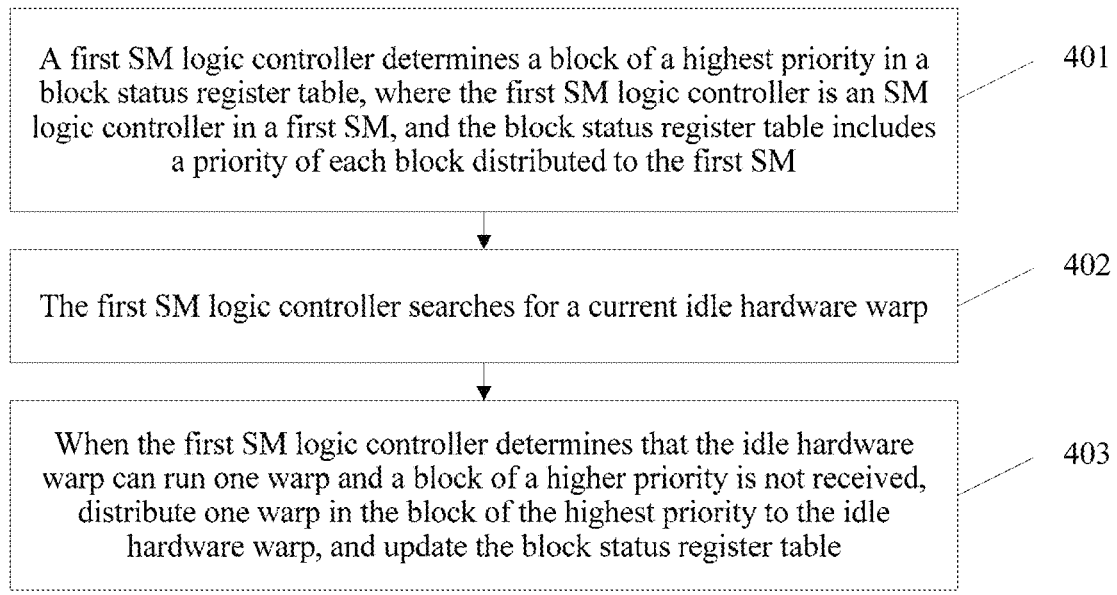
FIG. 4 is a flowchart of another GPU resource allocation method according to an embodiment of the present invention.

After a global logic controller distributes a block to an SM, the SM needs to properly distribute a warp in the block for running. Therefore, another embodiment of the present invention provides a method for distributing a warp by a first SM logic controller after step 204 in which when the global logic controller finds a first SM, one block in a to-be-distributed kernel program is distributed to the first SM. As shown in FIG. 4, the method includes the following steps.

401. The first SM logic controller determines a block of a highest priority in a block status register table, where the first SM logic controller is an SM logic controller in the first SM, and the block status register table includes a priority of each block distributed to the first SM.

With reference to the GPU resource allocation system shown in FIG. 1, the global logic controller is connected to at least two SMs. After the global logic controller distributes one block in a kernel program of a highest priority to the first SM, the first SM logic controller in the first SM needs to distribute a warp in the block to a hardware warp for running.

A block in another kernel is further running in the first SM, or a block of another kernel program is waiting to be run. Therefore, the first SM logic controller needs to determine the block of the highest priority in the block status register table, and runs a warp in the block of the highest priority.

It should be noted that a priority of a block stored in the block status register is a priority of a kernel to which the block belongs, and priorities of blocks in a same kernel are the same.

402. The first SM logic controller searches for a current idle hardware warp.

It should be noted that when the first SM logic controller finds the idle hardware warp, the following step 403 is performed; or when the first SM logic controller does not find the idle hardware warp, a searching action is repeated until the idle hardware warp is found, and the following step 403 continues to be performed.

A kernel program of a low priority is further running in the first SM. Therefore, after a warp in the kernel program of a low priority completes running, there appears a hardware warp that restores to an idle state. At this moment, the first SM logic controller can find the idle hardware warp, and a warp in a kernel program of a high priority can occupy the hardware warp.

403. When the first SM logic controller determines that the idle hardware warp can run one warp and a block of a higher priority is not received, distribute one warp in the block of the highest priority to the idle hardware warp, and update the block status register table.

A method for determining whether the idle hardware warp can run one warp is: determining whether a quantity of registers in the first SM is sufficient for running one warp. If the quantity of registers in the first SM is sufficient for running one warp, and at this moment, the first SM does not receive a block of a higher priority, one warp in the block of the highest priority at this moment is distributed to the found idle hardware warp; or if the quantity of registers in the first SM is not sufficient for running one warp, waiting continues, and one warp is distributed to the idle hardware warp when there appears a warp whose running is complete and the quantity of registers is sufficient for running one warp.

It should be noted that after one warp in the block of the highest priority is distributed to the idle hardware warp, it further needs to determine whether distribution of the block of the highest priority is complete. If the distribution of the block of the highest priority is complete, the foregoing steps 401 to 403 are performed again; or if the distribution of the block of the highest priority is not complete, the foregoing steps 402 to 403 are performed again.

According to the GPU resource allocation method provided in this embodiment of the present invention, the first SM logic controller first searches for the idle hardware warp; when the idle hardware warp is found and the first SM can run one warp at this moment, one warp in the block of the highest priority is distributed to the hardware warp for running, and there is no need to wait for the first SM to have a resource that can run the entire block and distribute the entire block to the hardware warp for running. In this way, waiting time is reduced, and a response speed of the kernel program of a high priority is improved.

In another implementation of the embodiment of the present invention, when determining that there is a warp whose running is complete, the first SM logic controller instructs the global logic controller to update a quantity of remaining registers, a quantity of remaining hardware warps, and remaining shared storage space of the first SM in an SM status register table, to reduce idle resources in the SM and improve resource utilization of the SM, so as to accelerate the response speed of the kernel program of a high priority.

It may be understood that when running of one warp is complete, a register, a hardware warp, and shared storage required for running the warp are all released, and therefore, the quantity of remaining registers, the quantity of remaining hardware warps, and the remaining shared storage space of the first SM in the SM status register table need to be updated in real time, so that the global logic controller delivers a block to the SM in time.

According to the GPU resource allocation method provided in this embodiment of the present invention, when determining that there is a warp whose running is complete, the first logic controller instructs the global logic controller to update the SM status register table, so that the global logic controller can deliver a block in the kernel of a high priority to the SM in time according to a latest quantity of remaining resources in the SM and a quantity of undistributed blocks, so as to improve the resource utilization of the SM and accelerate the response speed of the kernel program of a high priority.

Figure 5:
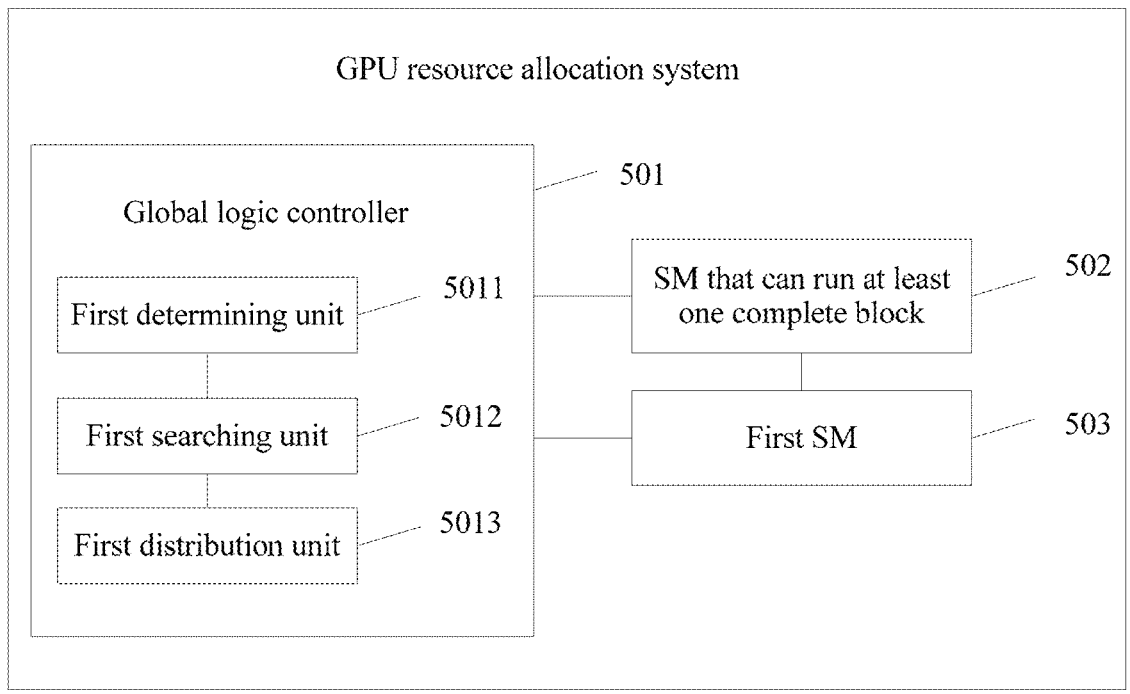
FIG. 5 is a schematic diagram of a logical structure of another GPU resource allocation system according to an embodiment of the present invention.

With reference to the GPU resource allocation methods shown in FIG. 2 to FIG. 4, an embodiment of the present invention further provides a GPU resource allocation system. As shown in FIG. 5, the system includes a global logic controller 501 and at least two streaming multiprocessors SMs that can communicate with the global logic controller 501. The global logic controller includes: a first determining unit 5011, a first searching unit 5012, and a first distribution unit 5013.

It should be noted that the SM in the system may be an SM 502 that can run at least one complete block or a first SM 503.

The first SM 503 is an SM that can run at least one warp.

The first determining unit 5011 is configured to determine a to-be-distributed kernel program, where a kernel status register table includes a priority of each still-running kernel program and a quantity of undistributed blocks in each still-running kernel program, and the to-be-distributed kernel program is a kernel program that has a highest priority in the kernel status register table and in which a quantity of undistributed blocks is not zero.

The first searching unit 5012 is configured to search an SM status register table for an SM that can run at least one complete block, where the SM status register table is configured to store a quantity of available resources in each SM; and when the SM that can run at least one complete block is not found, search the SM status register table for the first SM 503.

The first distribution unit 5013 is configured to: when the first SM 503 is found, distribute a block in the to-be-distributed kernel program to the first SM 503.

The first SM 503 is configured to run the block in the to-be-distributed kernel program distributed by the first distribution unit 5013.

In another embodiment of the present invention, the first determining unit 5011 is further configured to: when the first searching unit 5012 finds the SM that can run at least one complete block, determine a first quantity, where the first quantity is a quantity of blocks that can be actually run by the SM that can run one complete block.

The first distribution unit 5013 is further configured to: when a quantity of undistributed blocks in the to-be-distributed kernel program is greater than the first quantity, distribute a first quantity of blocks in the to-be-distributed kernel program to the SM that can run at least one complete block; or when a quantity of undistributed blocks in the to-be-distributed kernel program is less than or equal to the first quantity, distribute all undistributed blocks in the to-be-distributed kernel program to the SM 502 that can run at least one complete block.

The SM 502 that can run at least one complete block is configured to run the blocks in the to-be-distributed kernel program distributed by the first distribution unit 5013.

Figure 6:
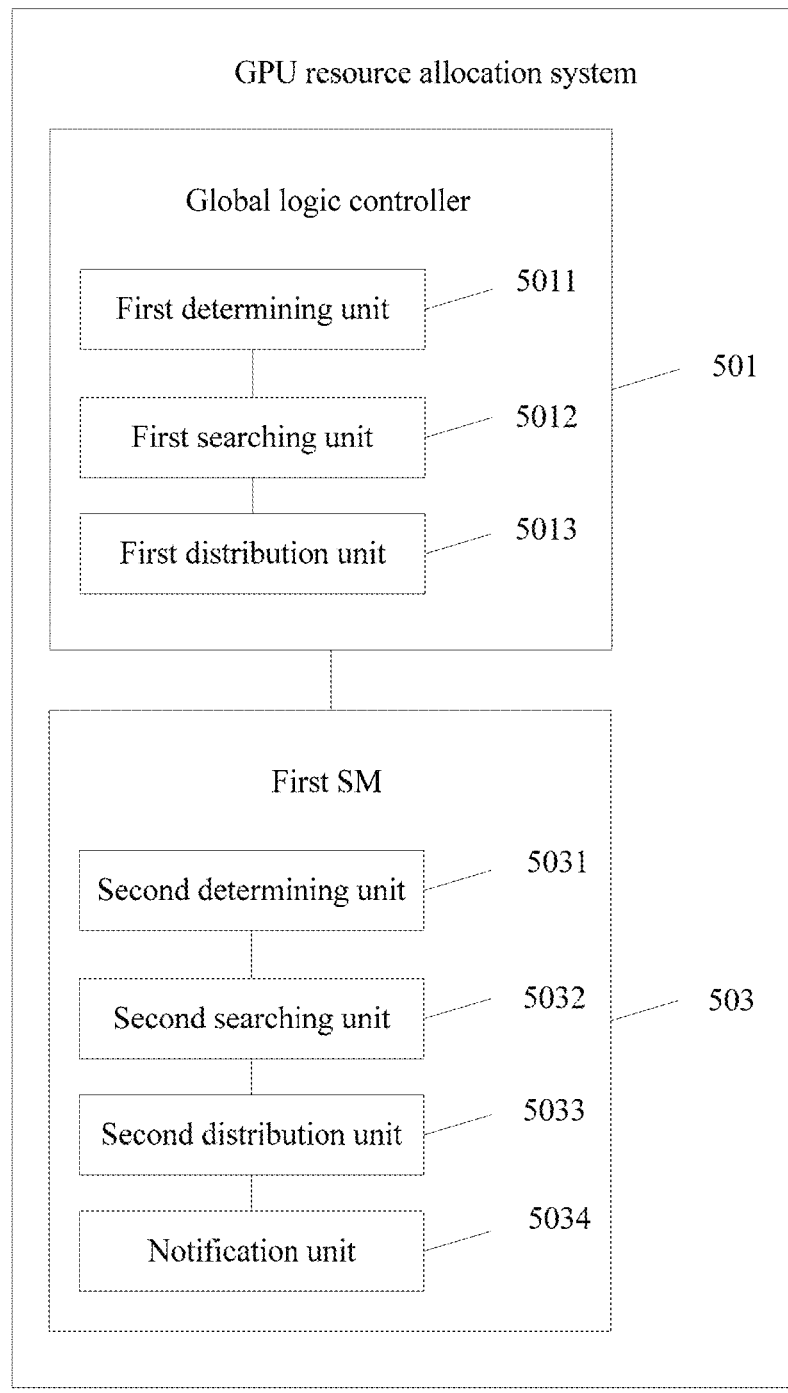
FIG. 6 is a schematic diagram of a logical structure of another GPU resource allocation system according to an embodiment of the present invention.

In another embodiment of the present invention, as shown in FIG. 6, the first SM 503 includes a second determining unit 5031, a second searching unit 5032, a second distribution unit 5033, and a notification unit 5034.

It should be noted that the second determining unit 5031, the second searching unit 5032, and the second distribution unit 5033 are specifically located in a first SM logic controller in the first SM 503.

The second determining unit 5031 is located in the first SM 503 logic controller, and is configured to determine a block of a highest priority in a block status register table, where the first SM 503 logic controller is an SM logic controller in the first SM 503, and the block status register table includes a priority of each block distributed to the first SM 503.

The second searching unit 5032 is located in the first SM 503 logic controller, and is configured to search for a current idle hardware warp.

The second distribution unit 5033 is located in the first SM 503 logic controller, and is configured to: when it is determined that the idle hardware warp can run one warp and a block of a higher priority is not received, distribute one warp in the block of the highest priority to the idle hardware warp, and update the block status register table.

It should be noted that a compositional structure of the SM 502 that can run at least one complete block is the same as that of the first SM 503, and is not described any further in this embodiment of the present invention.

It should be noted that the SM status register table includes a quantity of remaining registers, a quantity of remaining hardware warps, and remaining shared storage space of each SM, and the first SM 503 is an SM in which a quantity of remaining registers is greater than a quantity of registers required for running one warp, in which a quantity of remaining hardware warps is greater than a quantity of hardware warps required for running one warp, and whose remaining shared storage space is greater than shared storage space required for running one warp.

The second determining unit 5031 is further configured to determine whether there is a warp whose running is complete.

The notification unit 5034 is located in the first SM 503 logic controller, and is configured to: when the second determining unit 5031 determines there is a warp whose running is complete, instruct the global logic controller 501 to update a quantity of remaining registers, a quantity of remaining hardware warps, and remaining shared storage space of the first SM 503 in the SM status register table.

According to the GPU resource allocation system provided in this embodiment of the present invention, the first determining unit in the global logic controller identifies the to-be-distributed kernel program in the kernel status register table; the first searching unit searches in the SM status register table for the SM that can run at least one complete block, and when the SM that can run at least one block is not found, continues to search for the first SM that can run at least one warp; and the first distribution unit distributes the block in the to-be-distributed kernel program to the first SM. Compared with the prior art in which only when there is an idle SM in a GPU, a block in a kernel of a high priority can be distributed to the SM, and consequently, the kernel program of a high priority cannot obtain a timely response, in this embodiment of the present invention, when the SM that can run at least one block is not found, the first SM that can run at least one warp is searched for, instead of waiting for another kernel program to release a resource. The warp is smaller than the block, and therefore, completing running one warp is faster than completing running one block, so that the SM that can run at least one warp is easier to find. After the SM that can run at least one warp is found, one block in the to-be-distributed kernel program may be distributed to the first SM, and there is no need to wait for the kernel program of a low priority to complete running one block, so that a response speed of the kernel program of a high priority is improved.

Figure 7:
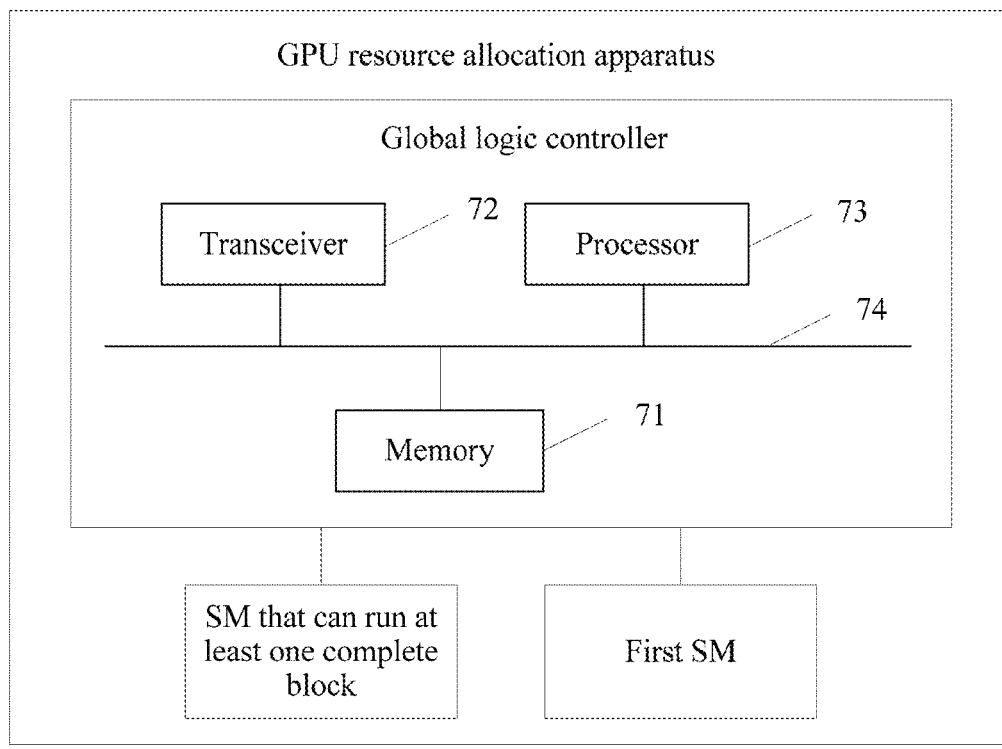
FIG. 7 is a schematic diagram of a logical structure of a GPU resource allocation apparatus according to an embodiment of the present invention.

An embodiment of the present invention further provides a GPU resource allocation apparatus. As shown in FIG. 7, the apparatus includes a global logic controller and at least two SMs that can communicate with the global logic controller. The SM may be an SM that can run at least one complete block or a first SM. The global logic controller may include a memory 71, a transceiver 72, a processor 73, and a bus 74. The memory 71, the transceiver 72, and the processor 73 are connected and communicate with each other by using the bus 74.

The memory 71 may be a read-only memory (Read Only Memory, ROM), a static storage device, a dynamic storage device, or a random access memory (Random Access Memory, RAM). The memory 71 may store an operating system and another application program. When the technical solution provided in this embodiment of the present invention is implemented by software or firmware, program code used to implement the technical solution provided in this embodiment of the present invention is stored in the memory 71, and is executed by the processor 73.

The transceiver 72 is used for communication between the apparatus and other devices or other communications networks (for example but without being limited to, an Ethernet, a radio access network (Radio Access Network, RAN), and a wireless local area network (Wireless Local Area Network, WLAN)).

The processor 73 may be a general central processing unit (Central Processing Unit, CPU), a microprocessor, an application-specific integrated circuit (Application Specific Integrated Circuit, ASIC), or one or more integrated circuits, and is configured to execute a related program, so as to implement the technical solution provided in this embodiment of the present invention.

The bus 74 may include a channel that transfers information between the parts (for example, the memory 71, the transceiver 72, and the processor 73) of the apparatus.

It should be noted that although hardware shown in FIG. 7 only includes the memory 71, the transceiver 72, the processor 73, and the bus 74, in a specific implementation process, a person skilled in the art should understand that the terminal further includes another component required for implementing normal running. In addition, depending on a specific requirement, a person skilled in the art should understand that a hardware component for implementing another function may also be included.

Specifically, when the global logic controller shown in FIG. 7 is configured to implement the system shown in the embodiment of FIG. 5, the processor 73 in the apparatus is coupled to the memory 71 and the transceiver 72, and is configured to control execution of a program instruction. The processor 73 is specifically configured to determine a to-be-distributed kernel program, where a kernel status register table includes a priority of each still-running kernel program and a quantity of undistributed blocks in each still-running kernel program, and the to-be-distributed kernel program is a kernel program that has a highest priority in the kernel status register table and in which a quantity of undistributed blocks is not zero; search an SM status register table for an SM that can run at least one complete block, where the SM status register table is configured to store a quantity of available resources in each SM; and when the SM that can run at least one complete block is not found, search the SM status register table for a first SM, where the first SM is an SM that can run at least one warp.

The transceiver 72 is configured to: when the first SM is found, distribute a block in the to-be-distributed kernel program to the first SM.

The memory 71 is configured to store the kernel status register table and the SM status register table.

The processor 73 is further configured to: when a first searching unit finds the SM that can run at least one complete block, determine a first quantity, where the first quantity is a quantity of blocks that can be actually run by the SM that can run one complete block.

The transceiver 72 is further configured to: when a quantity of undistributed blocks in the to-be-distributed kernel program is greater than the first quantity, distribute a first quantity of blocks in the to-be-distributed kernel program to the SM that can run at least one complete block; or when a quantity of undistributed blocks in the to-be-distributed kernel program is less than or equal to the first quantity, distribute all undistributed blocks in the to-be-distributed kernel program to the SM that can run at least one complete block.

Figure 8:
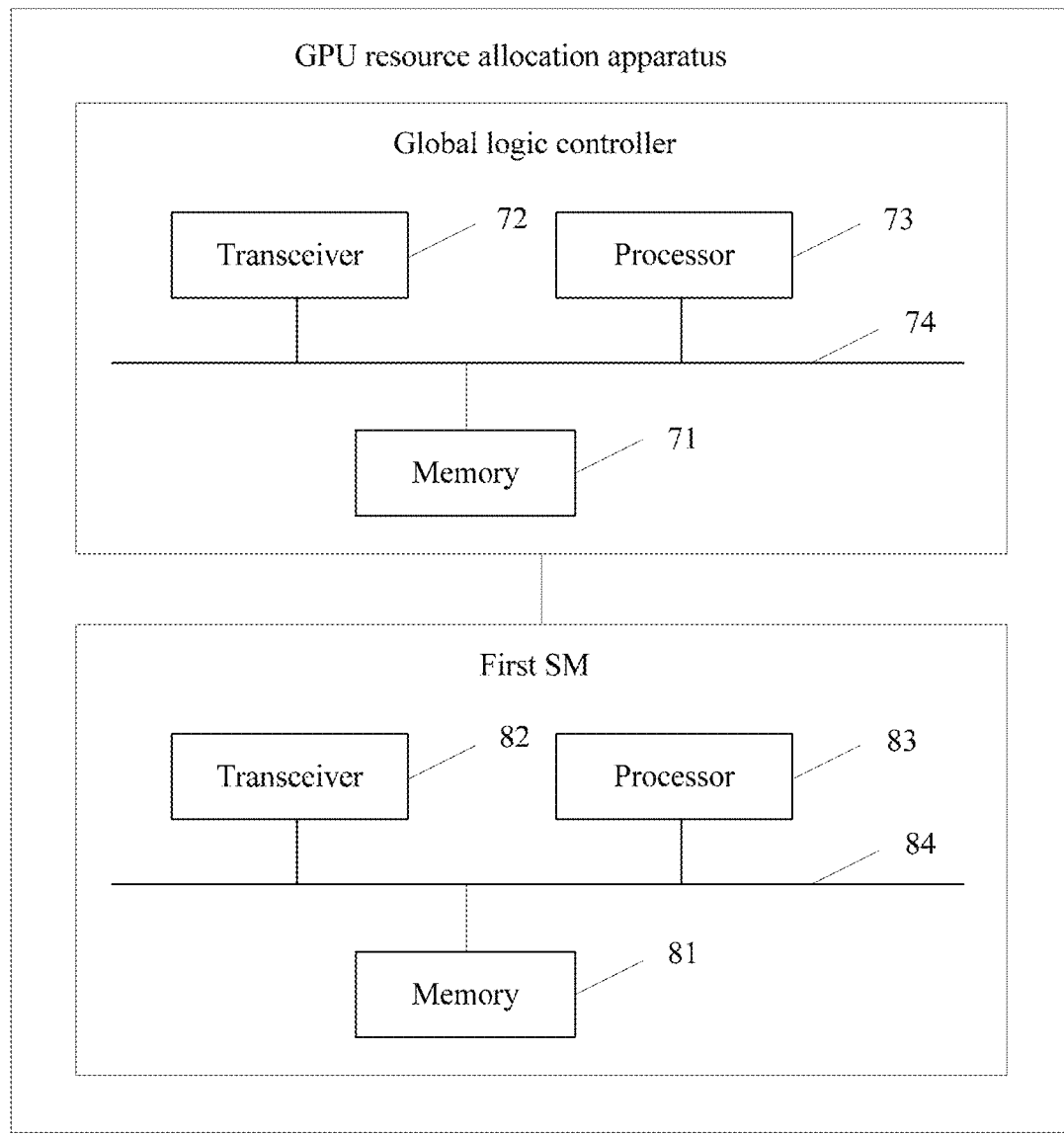
FIG. 8 is a schematic diagram of a logical structure of another GPU resource allocation apparatus according to an embodiment of the present invention.

In another embodiment of the present invention, as shown in FIG. 8, a first SM includes a memory 81, a transceiver 82, a processor 83, and a bus 84. The memory 81, the transceiver 82, and the processor 83 are connected and communicate with each other by using the bus 84.

The memory 81 may be a read-only memory (Read Only Memory, ROM), a static storage device, a dynamic storage device, or a random access memory (Random Access Memory, RAM). The memory 81 may store an operating system and another application program. When the technical solution provided in this embodiment of the present invention is implemented by software or firmware, program code used to implement the technical solution provided in this embodiment of the present invention is stored in the memory 81, and is executed by the processor 83.

The transceiver 82 is used for communication between the apparatus and other devices or other communications networks (for example but without being limited to, an Ethernet, a radio access network (Radio Access Network, RAN), and a wireless local area network (Wireless Local Area Network, WLAN)).

The processor 83 may be a general central processing unit (Central Processing Unit, CPU), a microprocessor, an application-specific integrated circuit (Application Specific Integrated Circuit, ASIC), or one or more integrated circuits, and is configured to execute a related program, so as to implement the technical solution provided in this embodiment of the present invention.

The bus 84 may include a channel that transfers information between the parts (for example, the memory 81, the transceiver 82, and the processor 83) of the apparatus.

It should be noted that although hardware shown in FIG. 8 only includes the memory 81, the transceiver 82, the processor 83, and the bus 84, in a specific implementation process, a person skilled in the art should understand that the terminal further includes another component required for implementing normal running. In addition, depending on a specific requirement, a person skilled in the art should understand that a hardware component for implementing another function may also be included.

Specifically, when the first SM shown in FIG. 8 is configured to implement the systems shown in the embodiments of FIG. 5 and FIG. 6, the processor 83 in the apparatus is coupled to the memory 81 and the transceiver 82, and is configured to control execution of a program instruction. The processor 83 is specifically configured to determine a block of a highest priority in a block status register table, where a first SM logic controller is an SM logic controller in the first SM, and the block status register table includes a priority of each block distributed to the first SM; and is configured to search for a current idle hardware warp.

The transceiver 82 is configured to: when it is determined that the idle hardware warp can run one warp and a block of a higher priority is not received, distribute one warp in the block of the highest priority to the idle hardware warp, and update the block status register table.

It should be noted that an SM status register table includes a quantity of remaining registers, a quantity of remaining hardware warps, and remaining shared storage space of each SM, and the first SM is an SM in which a quantity of remaining registers is greater than a quantity of registers required for running one warp, in which a quantity of remaining hardware warps is greater than a quantity of hardware warps required for running one warp, and whose remaining shared storage space is greater than shared storage space required for running one warp.

The transceiver 83 is further configured to: when it is determined that there is a warp whose running is complete, instruct a global logic controller to update a quantity of remaining registers, a quantity of remaining hardware warps, and remaining shared storage space of the first SM in the SM status register table.

According to the GPU resource allocation apparatus provided in this embodiment of the present invention, the processor identifies the to-be-distributed kernel program in the kernel status register table, searches in the SM status register table for the SM that can run at least one complete block, and when the SM that can run at least one block is not found, continues to search for the first SM that can run at least one warp; and the transceiver distributes the block in the to-be-distributed kernel program to the first SM. Compared with the prior art in which only when there is an idle SM in a GPU, a block in a kernel of a high priority can be distributed to the SM, and consequently, the kernel program of a high priority cannot obtain a timely response, in this embodiment of the present invention, when the SM that can run at least one block is not found, the first SM that can run at least one warp is searched for, instead of waiting for another kernel program to release a resource. The warp is smaller than the block, and therefore, completing running one warp is faster than completing running one block, so that the SM that can run at least one warp is easier to find. After the SM that can run at least one warp is found, one block in the to-be-distributed kernel program may be distributed to the first SM, and there is no need to wait for the kernel program of a low priority to complete running one block, so that a response speed of the kernel program of a high priority is improved.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor (processor) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A graphics processing unit (GPU) resource allocation method, wherein the method is applied to a GPU resource allocation system comprising a global logic controller and at least two streaming multiprocessors (SM) communicating with the global logic controller, and the method comprises:
   identifying, by the global logic controller, a to-be-distributed kernel program in a kernel status register table, wherein the kernel status register table comprises a value indicating a priority of each still-running kernel program and a value indicating a quantity of undistributed blocks in the still-running kernel program, wherein the to-be-distributed kernel program comprises a kernel program in the kernel status register table in which a quantity of undistributed blocks is nonzero;
   searching in, by the global logic controller, an SM status register table to identify a first SM that can run at least one block of the to-be-distributed kernel program, wherein the SM status register table is configured to store a quantity of available resources in each SM; and
   distributing a first block in the to-be-distributed kernel program to the first SM.

2. The GPU resource allocation method according to claim 1, wherein the method further comprises:
   Searching in, by the global logic controller, the SM status register table to identify a second SM that can run at least one warp; and
   distributing a second block in the to-be-distributed kernel program to the second SM.

3. The GPU resource allocation method according to claim 1, wherein after the searching, by the global logic controller, the SM status register table to determine the first SM, the method further comprises:
   determining a first quantity, of blocks that can be run by the first SM; and
   distributing the first quantity of blocks in the to-be-distributed kernel program to the first SM when the quantity of undistributed blocks in the to-be-distributed kernel program is greater than the first quantity.

4. The GPU resource allocation method according to claim 1, wherein after the searching in, by the global logic controller, the SM status register table to identify the first SM, the method further comprises:
   distributing all undistributed blocks in the to-be-distributed kernel program to the first SM when the quantity of undistributed blocks in the to-be-distributed kernel program is less than or equal to the first quantity.

5. The GPU resource allocation method according to claim 1, the method further comprises:
   determining, by a first SM logic controller, a block of a highest priority in a block status register table, wherein the first SM logic controller is in the first SM, and the block status register table comprises a value indicating a priority of each block distributed to the first SM;
   searching, by the first SM logic controller, for a current idle hardware warp; and
   distributing one warp in the block of the highest priority to the idle hardware warp when the first SM logic controller determines that the idle hardware warp can run one warp and a block of a higher priority is not received, and
   updating the block status register table.

6. The GPU resource allocation method according to claim 1, wherein the SM status register table comprises a value indicating a quantity of remaining registers, a value indicating a quantity of remaining hardware warps and remaining shared storage space of each SM, and a value indicating a quantity of remaining registers in the first SM is greater than a quantity of registers required for running one warp, a value indicating quantity of remaining hardware warps in the first SM is greater than a quantity of hardware warps required for running one warp, and information indicating remaining shared storage space of the first SM is greater than shared storage space required for running one warp.

7. The GPU resource allocation method according to claim 6, the method further comprises:
   determining, by the first SM logic controller, that there is a completed warp; and
   instructing, by the first SM logic controller, the global logic controller to update a quantity of remaining registers, a quantity of remaining hardware warps, and remaining shared storage space of the first SM in the SM status register table.

8. A GPU resource allocation system comprising a global logic controller and at least two SM communicating with the global logic controller, and the global logic controller comprises a memory and a first processor, wherein the first processor is configured to:
- identify a to-be-distributed kernel program in a kernel status register table, wherein the kernel status register table comprises a value indicating a priority of each still-running kernel program and a quantity of undistributed blocks in the still-running kernel program, wherein the to-be-distributed kernel program comprises a kernel program in the kernel status register table in which a quantity of undistributed blocks is nonzero;
- search in an SM status register table to identify a first SM that can run at least one block of the to-be-distributed kernel program, wherein the SM status register table is configured to store a quantity of available resources in each SM; and
- distribute a first block in the to-be-distributed kernel program to the first SM.

9. The GPU resource allocation system according to claim 8, wherein the first processor is further configured to:
- search in the SM status register table to identify a SM that can run at least one warp; and
- distribute a second block in the to-be-distributed kernel program to the second SM.

10. The GPU resource allocation system according to claim 8, wherein the first processor is further configured to: determine a first quantity of blocks that can be run by the first SM; and
- distribute the first quantity of blocks in the to-be-distributed kernel program to the first SM when the quantity of undistributed blocks in the to-be-distributed kernel program is greater than the first quantity.

11. The GPU resource allocation system according to claim 8, wherein the first processor is further configured to distribute all undistributed blocks in the to-be-distributed kernel program to the first SM when the quantity of undistributed blocks in the to-be-distributed kernel program is less than or equal to the first quantity.

12. The GPU resource allocation system according to claim 8, wherein the first SM comprises a second processor and a second memory, the second processor is configured to:
- determine a block of a highest priority in a block status register table, wherein the first SM logic controller is in the first SM, and the block status register table comprises a value indicating a priority of each block distributed to the first SM;
- search for a current idle hardware warp; and
- distribute one warp in the block of the highest priority to the idle hardware warp when the first SM logic controller determines that the idle hardware warp can run one warp and a block of a higher priority is not received, and
- update the block status register table.

13. The GPU resource allocation system according to claim 8, wherein the SM status register table comprises a value indicating a quantity of remaining registers, a value indicating a quantity of remaining hardware warps remaining shared storage space of each SM, and a value indicating a quantity of remaining registers in the first SM is greater than a quantity of registers required for running one warp, a value indicating a quantity of remaining hardware warps in the first SM is greater than a quantity of hardware warps required for running one warp, and a value indicating remaining shared storage space of the first SM is greater than shared storage space required for running one warp.

14. The GPU resource allocation system according to claim 13, wherein the second processor is further configured to: determine a completed warp; and
- instruct the global logic controller to update a quantity of remaining registers, a quantity of remaining hardware warps, and remaining shared storage space of the first SM in the SM status register table.

* * * * *